(12) United States Patent
Kaneta (10) Patent No.: US 10,007,642 B2
(45) Date of Patent: Jun. 26, 2018

(54) INFORMATION PROCESSING DEVICE, INFORMATION PROCESSING METHOD, AND PROGRAM

(71) Applicant: Rakuten, Inc., Tokyo (JP)

(72) Inventor: Yusaku Kaneta, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days. days.

(21) Appl. No.: 15/328,904

(22) PCT Filed: May 15, 2015

(86) PCT No.: PCT/JP2015/064100
§ 371 (c)(1),
(2) Date: Jan. 25, 2017

(87) PCT Pub. No.: WO2016/185528
PCT Pub. Date: Nov. 24, 2016

(65) Prior Publication Data
US 2017/0213600 A1    Jul. 27, 2017

(51) Int. Cl.
*G06F 17/16*    (2006.01)
*G06F 17/10*    (2006.01)

(52) U.S. Cl.
CPC .............. *G06F 17/16* (2013.01); *G06F 17/10* (2013.01)

(58) Field of Classification Search
CPC .............................. G06F 7/4836; G06F 17/16
USPC ....................................................... 708/290
See application file for complete search history.

(56) References Cited

FOREIGN PATENT DOCUMENTS

WO    WO 2005106704 A1 * 11/2005 ............. G06F 17/10

OTHER PUBLICATIONS

Takaoka, T. "Efficient algorithms for the maximum subarray problem by distance matrix multiplication," Electronic Notes in Theoretical Computer Science, vol. 61, 2002, pp. 191-200.*
Perumalla et al. "Parallel Algorithms for Maximum Subsequence and Maximum Subarray." Parallel Processing Letters, vol. 5, No. 3, 1995, pp. 367-373.*
Jon Bentley, "programming pearls", Communications of the ACM, vol. 27, No. 9, pp. 865-871, Sep. 1984.
Douglas R. Smith, "Applications of a Strategy for Designing Divide-and-Conquer Algorithms", Science of Computer Programming 8, pp. 213-229,Elsevier Science Publishers B.V. (North Holland) 1987.

(Continued)

*Primary Examiner* — Harry W Byrne
*Assistant Examiner* — R Lance Reidlinger
(74) *Attorney, Agent, or Firm* — HEA Law PLLC (57) ABSTRACT

Provided is an information processing device configured to: acquire blocks, each of the blocks being a part of an array; generate a total sum block, a maximum block, a first maximum block, and a last maximum block for a plurality of sub; iteratively execute processing of calculating, for a new sub-block, a new total sum block, a new maximum block, a new first maximum block, and a new last maximum block; determine, after the processing is executed a predetermined number of times, a total sum of element values, a maximum value of subset sums, a maximum value of subset sums summed from a first element, and a maximum value of subset sums summed to a last element for each of the blocks; and calculate the maximum value of subset sums in the array based on the determined values.

5 Claims, 6 Drawing Sheets

(56) References Cited

OTHER PUBLICATIONS

Ferreira da Luz C S, "Implemantacoes De Algoritmos Paralelos Da Subsequencia Maxima E Da Submatriz Em GPU", Master's thesis, Universidade Federal do ABC, Santo Andre, Brasil, 2013, XP055463967, Retrieved from the Internet: URL:http://poscomp.ufabc.edu.br/images/uploadedfiles/dissertacoesDefendidas/pdf/dissertaiao-cleber-luz.pdf [retrieved on Mar. 29, 2018].

Alves C E R et al, "Computing maximum subsequence in parallel", II Brazilian Workshop on Bioinformatics (WOB 2003), Dec. 3-5, 2003, Macae, RJ, Brasil, Dec. 3, 2003 (Dec. 3, 2003), pp. 80-87, XP055463971, Retrieved from the Internet: URL:https://www.ime.usp.br/-song/mac5705/wob03.pdf [retrieved on Mar. 29, 2018].

Search Report dated Apr. 9, 2018, for corresponding EP Patent Application No. 15892528.9. (Providing a concise explanation of relevance for references 1 and 2. Please see the category of relevance on p. 3.).

\* cited by examiner

INFORMATION PROCESSING DEVICE, INFORMATION PROCESSING METHOD, AND PROGRAM

CROSS REFERENCE TO RELATED APPLICATIONS

This application is a National Stage of International Application No. PCT/JP2015/064100 filed on May 15, 2015. The contents of the above document is incorporated herein by reference in its entirety.

TECHNICAL FIELD

The present invention relates to an information processing device, an information processing method, and a program.

BACKGROUND ART

As a general analysis method to be used for detecting a variation in temperature and analyzing an image, there is employed calculation of a maximum subset sum of an array. A Kadane method is known as an algorithm for acquiring the maximum subset sum of this array (in the following, the number of elements of this array is denoted as n), and the computational complexity of this algorithm is O(n). Further, there is also employed a method (Smith method) for acquiring, for example, a value of a maximum subset sum of an array, which is obtained by merging two consecutive arrays, with use of, for example, a value of a maximum subset sum of each of the two arrays.

The method of calculating a maximum subset sum devised by Kadane and the method of calculating a maximum subset sum devised by Smith are disclosed in Non Patent Literature 1 and Non Patent Literature 2, respectively.

CITATION LIST

Non Patent Literature

[Non Patent Literature 1] Jon Bentley, "programming pearls", Communications of the ACM volume 27 Number 9, pp. 865-871, September 1984.
[Non Patent Literature 2] Douglas R. Smith, "Applications of a strategy for designing divide-and-conquer algorithms", Science of Computer Programming 8, pp. 213-229, 1987.

SUMMARY OF INVENTION

Technical Problem

The Kadane method iterates processing so as to acquire the maximum subset sum, and thus requires a result of previous processing in order to calculate a result of current processing. Therefore, processing time cannot be reduced by parallel processing. The Smith method only discloses implementation of the method with a program employing recursive processing and processing of the method by dedicated hardware, and does not discussed specific and practical implementation of parallel processing by general-purpose hardware.

The present invention has been made in view of the above-mentioned problems, and therefore has an object to provide an information processing device, an information processing method, and a program, which are capable of quickly acquiring a maximum subset sum of an array by parallel processing to be executed with a program.

Solution to Problem

In order to solve the above-mentioned problems, according to one embodiment of the present invention, there is provided an information processing device, including: block acquisition means for acquiring blocks, each of the blocks containing a series of a predetermined number of elements and being a part of an array, the array containing a plurality of elements containing respective element values; block parameter determination means for determining, based on the acquired blocks, for each of the blocks, a total sum of element values, a maximum value of subset sums, a maximum value of subset sums summed from a first element, and a maximum value of subset sums summed to a last element; and maximum subset sum calculation means for calculating a maximum value of subset sums in the array constructed by combining the blocks, based on the total sum of element values, the maximum value of subset sums, the maximum value of subset sums summed from the first element, and the maximum value of subset sums summed to the last element for the each of the blocks, in which the block parameter determination means includes: initial processing means for generating: a total sum block in which total sums of element values, which are respectively acquired for a plurality of sub-blocks obtained by dividing the each of the acquired blocks, are arrayed and stored in a register; a maximum block in which maximum values of subset sums, which are respectively calculated for the plurality of sub-blocks, are arrayed and stored in a register; a first maximum block in which maximum values of subset sums summed from the first element, which are respectively calculated for the plurality of sub-blocks, are arrayed and stored in a register; and a last maximum block in which maximum values of subset sums summed to the last element, which are respectively calculated for the plurality of sub-blocks, are arrayed and stored in a register; iterative processing means for iteratively executing processing of calculating, for a plurality of new sub-blocks containing a new sub-block obtained by combining adjacent two of the plurality of sub-blocks, a new total sum block, a new maximum block, a new first maximum block, and a new last maximum block to be stored into a plurality of registers, respectively, by operating the total sum block, the maximum block, the first maximum block, and the last maximum block for the plurality of sub-blocks with predetermined processor instructions for operating, in bulk, values of a plurality of sub-blocks stored in a register; and determination means for determining, after the processing is executed a predetermined number of times, the total sum of element values, the maximum value of subset sums, the maximum value of subset sums summed from the first element, and the maximum value of subset sums summed to the last element for the each of the blocks, based on the total sum block, the maximum block, the first maximum block, and the last maximum block.

Further, according to one embodiment of the present invention, there is provided an information processing method, including: a step of acquiring blocks, each of the blocks containing a series of a predetermined number of elements and being a part of an array, the array containing a plurality of elements containing respective element values; a block parameter determination step of determining, based on the acquired blocks, for each of the blocks, a total sum of element values, a maximum value of subset sums, a maximum value of subset sums summed from a first element, and a maximum value of subset sums summed to a last element; and a step of calculating a maximum value of subset sums in the array constructed by combining the blocks, based on the total sum of element values, the maximum value of subset sums, the maximum value of subset sums summed from the first element, and the maximum value of subset sums summed to the last element for the each of the blocks, in which the block parameter determination step includes: generating: a total sum block in which total sums of element values, which are respectively calculated for a plurality of sub-blocks obtained by dividing the each of the acquired blocks, are arrayed and stored in a register; a maximum block in which maximum values of subset sums, which are respectively calculated for the plurality of sub-blocks, are arrayed and stored in a register; a first maximum block in which maximum values of subset sums summed from the first element, which are respectively calculated for the plurality of sub-blocks, are arrayed and stored in a register; and a last maximum block in which maximum values of subset sums summed to the last element, which are respectively acquired for the plurality of sub-blocks, are arrayed and stored in a register; iteratively executing processing of calculating, for a plurality of new sub-blocks containing a new sub-block obtained by combining adjacent two of the plurality of sub-blocks, a new total sum block, a new maximum block, a new first maximum block, and a new last maximum block to be stored into a plurality of registers, respectively, by operating the total sum block, the maximum block, the first maximum block, and the last maximum block for the plurality of sub-blocks with predetermined processor instructions for operating, in bulk, values of a plurality of sub-blocks stored in a register; and determining, after the processing is executed a predetermined number of times, the total sum of element values, the maximum value of subset sums, the maximum value of subset sums summed from the first element, and the maximum value of subset sums summed to the last element for the each of the blocks, based on the total sum block, the maximum block, the first maximum block, and the last maximum block.

Further, according to one embodiment of the present invention, there is provided a program for causing a computer to function as: block acquisition means for acquiring blocks, each of the blocks containing a series of a predetermined number of elements and being a part of an array, the array containing a plurality of elements containing respective element values; block parameter determination means for determining, based on the acquired blocks, for each of the blocks, a total sum of element values, a maximum value of subset sums, a maximum value of subset sums summed from a first element, and a maximum value of subset sums summed to a last element; and maximum subset sum calculation means for calculating a maximum value of subset sums in the array constructed by combining the blocks, based on the total sum of element values, the maximum value of subset sums, the maximum value of subset sums summed from the first element, and the maximum value of subset sums summed to the last element for the each of the blocks, in which the block parameter determination means includes: initial processing means for generating: a total sum block in which total sums of element values, which are respectively calculated for a plurality of sub-blocks obtained by dividing the each of the acquired blocks, are arrayed and stored in a register; a maximum block in which maximum values of subset sums, which are respectively calculated for the plurality of sub-blocks, are arrayed and stored in a register; a first maximum block in which maximum values of subset sums summed from the first element, which are respectively calculated for the plurality of sub-blocks, are arrayed and stored in a register; and a last maximum block in which maximum values of subset sums summed to the last element, which are respectively calculated for the plurality of sub-blocks, are arrayed and stored in a register; iterative processing means for iteratively executing processing of calculating, for a plurality of new sub-blocks containing a new sub-block obtained by combining adjacent two of the plurality of sub-blocks, a new total sum block, a new maximum block, a new first maximum block, and a new last maximum block to be stored into a plurality of registers, respectively, by operating the total sum block, the maximum block, the first maximum block, and the last maximum block for the plurality of sub-blocks with predetermined processor instructions for operating, in bulk, values of a plurality of sub-blocks stored in a register; and determination means for determining, after the processing is executed a predetermined number of times, the total sum of element values, the maximum value of subset sums, the maximum value of subset sums summed from the first element, and the maximum value of subset sums summed to the last element for the each of the blocks, based on the total sum block, the maximum block, the first maximum block, and the last maximum block.

According to the present invention, it is possible to quickly calculate the maximum subset sum of an array by parallel processing to be executed with a program.

In one aspect of the present invention, the iterative processing means may be configured to, with a plurality of predetermined processor instructions: calculate the new total sum block in which a sum of a total sum of element values for a former block on the first element side among the adjacent two of the plurality of sub-blocks, and a total sum of element values for a latter block on the last element side among the adjacent two of the plurality of sub-blocks is placed as a total sum of element values for the new sub-block; calculate the new first maximum block in which a larger one of a sum, which is the sum of the total sum of element values for the former block and a maximum value of subset sums summed from the first element for the latter block, and a maximum value of subset sums summed from the first element for the former block is placed as a maximum value of subset sums summed from the first element for the new sub-block; calculate the new last maximum block in which a larger one of a sum, which is the sum of a total sum for the latter block and a maximum value of subset sums summed to the last element for the former block, and a maximum value of subset sums summed to the last element for the latter block is placed as a maximum value of subset sums summed to the last element for the new sub-block; and calculate the new maximum block in which a largest one of a sum, which is the sum of the maximum value of subset sums summed to the last element for the former block and the maximum value of subset sums summed from the first element for the latter block, a maximum value of subset sums for the former block, and a maximum value of subset sums for the latter block is placed as a maximum value of subset sums for the new sub-block.

In one aspect of the present invention, the block acquisition means may be configured to acquire a next block as a current block after the determination means determines the total sum of element values, the maximum value of subset sums, the maximum value of subset sums summed from the first element, and the maximum value of subset sums summed to the last element for the each of the blocks, block parameter determination means may be configured to determine, for the current block, the total sum of element values, the maximum value of subset sums, the maximum value of subset sums summed from the first element, and the maximum value of subset sums summed to the last element, and the maximum subset sum calculation means may be configured to determine, each time the determination means determines the total sum of element values, the maximum value of subset sums, the maximum value of subset sums summed from the first element, and the maximum value of subset sums summed to the last element for the current block, a maximum value of subset sums in a new element group consisting of from a first element value of the array to a last element of the current block, and a maximum value of subset sums summed to a final element in the new element group, based on a maximum value of subset sums in an element group consisting of from the first element of the array to the last element of a previous block, a maximum value of subset sums summed to the final element in the element group, the total sum of element values, the maximum value of subset sums, the maximum value of subset sums summed from the first element, and the maximum value of subset sums summed to the last element for the current block.

According to this aspect, even when, for example, arrays are output little by little in a streaming manner, it is possible to efficiently acquire the maximum subset sums of arrays that have been output up until now.

DESCRIPTION OF EMBODIMENTS

An embodiment of the present invention is now described with reference to the drawings. Constituent elements in the following description having the same function as each other are denoted with the same reference symbol, and a duplicate description of such constituent elements is omitted. In the following, as an example of an information processing device, a description is given of a device configured to acquire an input array, which is a series of elements each containing a signed integer element, and to output a maximum subset sum for the input array. In this example, unless otherwise specified, it is assumed that each element of this input array is a value of difference between a temperature measured by a temperature sensor and a previously measured temperature.

In this description, the maximum subset sum refers to a maximum subset sum of subset sums of an array, which is a series of elements each containing a value. Specifically, the maximum subset sum refers to a maximum value among 0 and sums of values of from a v-th element to a w-th element, the sums each being calculated for a combination of integers v and w satisfying $1 \leq v \leq w \leq n$ when the number of elements of the array is denoted as n. The maximum subset sum is 0 in a particular case where all the values of elements are negative values, and this case corresponds to no element being used for calculating the sum. Further, for example, when each element of the array indicates a difference between a temperature measured by a temperature sensor and a previously measured temperature, the maximum subset sum corresponds to a maximum range of temperature rises.

Figure 1:
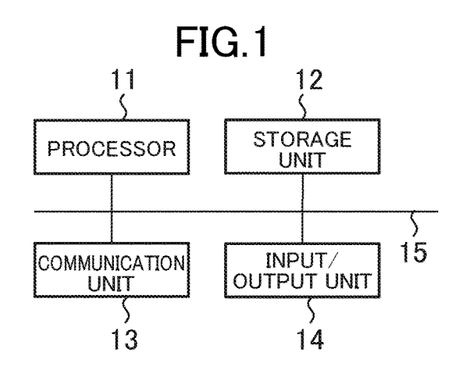
FIG. 1 is a diagram for illustrating an example of a hardware configuration of an information processing device according to an embodiment of the present invention.

FIG. 1 is a diagram for illustrating an example of a hardware configuration of an information processing device according to the embodiment of the present invention. The information processing device according to the embodiment of the present invention is, for example, a server computer or a personal computer. The information processing device includes a processor 11, a storage unit 12, a communication unit 13, an input/output unit 14, and a bus 15.

The processor 11 is configured to operate based on programs stored in the storage unit 12. Further, the processor 11 is configured to control the communication unit 13 and the input/output unit 14. The processor 11 may include a SIMD operation function for calculating a plurality of pieces of data in parallel. The above-mentioned programs may be provided via the Internet and the like, or may be provided by being stored in a computer-readable storage medium, e.g., a flash memory or a DVD-ROM.

The storage unit 12 is constructed from a memory element, e.g., a RAM or a flash memory, or from a hard disk drive. The storage unit 12 stores the above-mentioned programs. Further, the storage unit 12 stores information input from various units and calculation results.

The communication unit 13, which implements a function for communicating to/from another device, is constructed from, for example, an integrated circuit or a connector terminal of a wired LAN, or an integrated circuit or an antenna of a wireless LAN. The communication unit 13 is configured to, under the control of the processor 11, input information received from another device to the processor 11 and the storage unit 12, and to transmit information to another device.

The input/output unit 14 is constructed from, for example, a video controller configured to control display output means and a controller configured to acquire data from an input device. Examples of the input device include a keyboard, a mouse, and a touch panel. The input/output unit 14 is configured to, under the control of the processor 11, output display data to a display output device, and to acquire data input by a user operating the input device. The display output device is, for example, an externally connected display device or a display panel built in the information processing device.

The bus 15 connects the processor 11, the storage unit 12, the communication unit 13, and the input/output unit 14 to one another, and allows transmission of signals containing data among those components.

Figure 2:
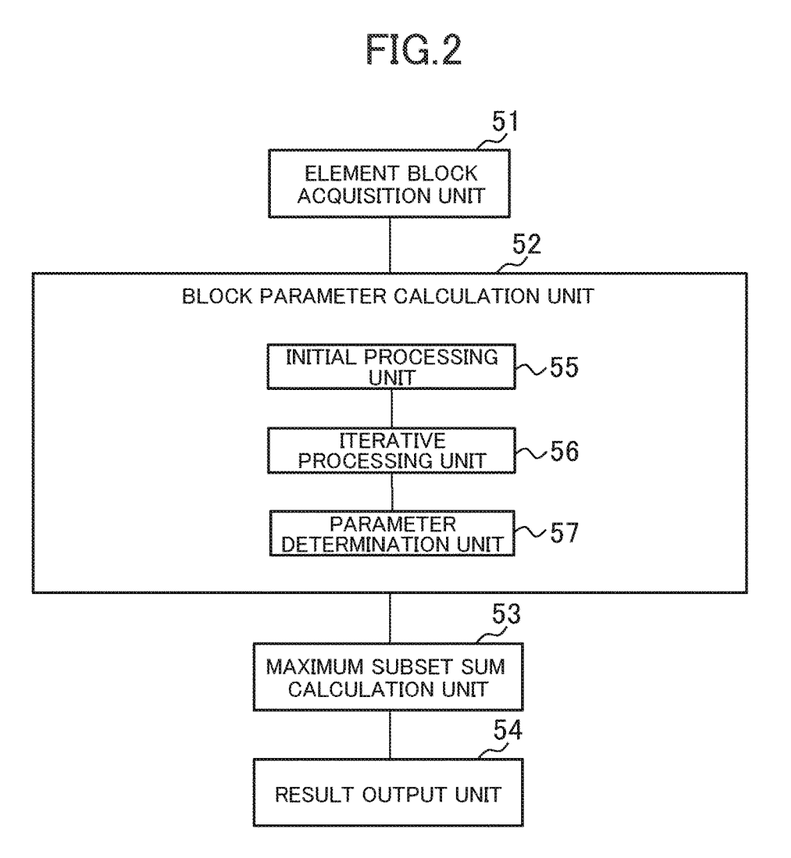
FIG. 2 is a block diagram for illustrating functions implemented by the information processing device.

FIG. 2 is a block diagram for illustrating functions to be implemented by the information processing device. From the functional point of view, the information processing device includes an element block acquisition unit 51, a block parameter calculation unit 52, a maximum subset sum calculation unit 53, and a result output unit 54. Further, from the functional point of view, the block parameter calculation unit 52 includes an initial processing unit 55, an iterative processing unit 56, and a parameter determination unit 57. In this embodiment, the element block acquisition unit 51, the block parameter calculation unit 52, the maximum subset sum calculation unit 53, and the result output unit 54 are provided by the processor 11 executing programs stored in the storage unit 12 to control the communication unit 13 or the input/output unit 14.

The element block acquisition unit 51 is configured to acquire an element block A, which is a series of a predetermined number of elements. This series of elements is a part of an input array, which contains a plurality of elements each containing an element value. The element block acquisition unit 51 may be configured to acquire a part of an input array that is stored in the storage unit 12 in advance as the element block A, or may be configured to acquire the element block A that is transmitted from another computer via the communication unit 13 in a streaming manner, or may be configured to generate the element block A based on measurement values that have been acquired from a measurement device via the input/output unit 14 for a certain period of time. For example, the plurality of elements contained in this input array are information indicating variations in measured temperature in time series. That is, each of the plurality of elements stores a relative value of temperature with the temperature indicated by its previous element being set as a reference. The value of temperature at the start of measurement and the input array allow temperature to be grasped in time series. The input array may be the one indicating values of a stock price in time series, or may be the one indicating a series of values of a reflected wave measured by a radar, or may be the one indicating values of differences between prices or values of sales in an electronic commerce web site. When the input array is the one indicating values of differences between prices or values of sales, it is possible to perform an analysis on a price variation or a sales trend.

Further, the element block acquisition unit 51 may be configured to acquire an array that stores absolute values and generate an input array from the acquired array. In this context, the absolute value indicates a measurement value itself, e.g., a value of temperature, and the relative value is a value obtained by subtracting, from a measurement value corresponding to an element that stores the relative value, a measurement value corresponding to a previous element of that element. For example, a temperature sensor may output an array of absolute values of measurement values via a network, and then the element block acquisition unit 51 may receive that array via the communication unit 13 so as to generate an array of values of difference as the input array based on that array of absolute values.

In other cases, when the temperature sensor outputs differences between the currently measured temperature and the previously measured temperature, the element block acquisition unit 51 may be configured to directly acquire an input array that stores the relative values. For example, another computer including a temperature sensor may generate and transmit an array of values of difference from the previous measurement values, and the element block acquisition unit 51 may receive that array of values of difference as the input array via the communication unit 13.

Figure 3:
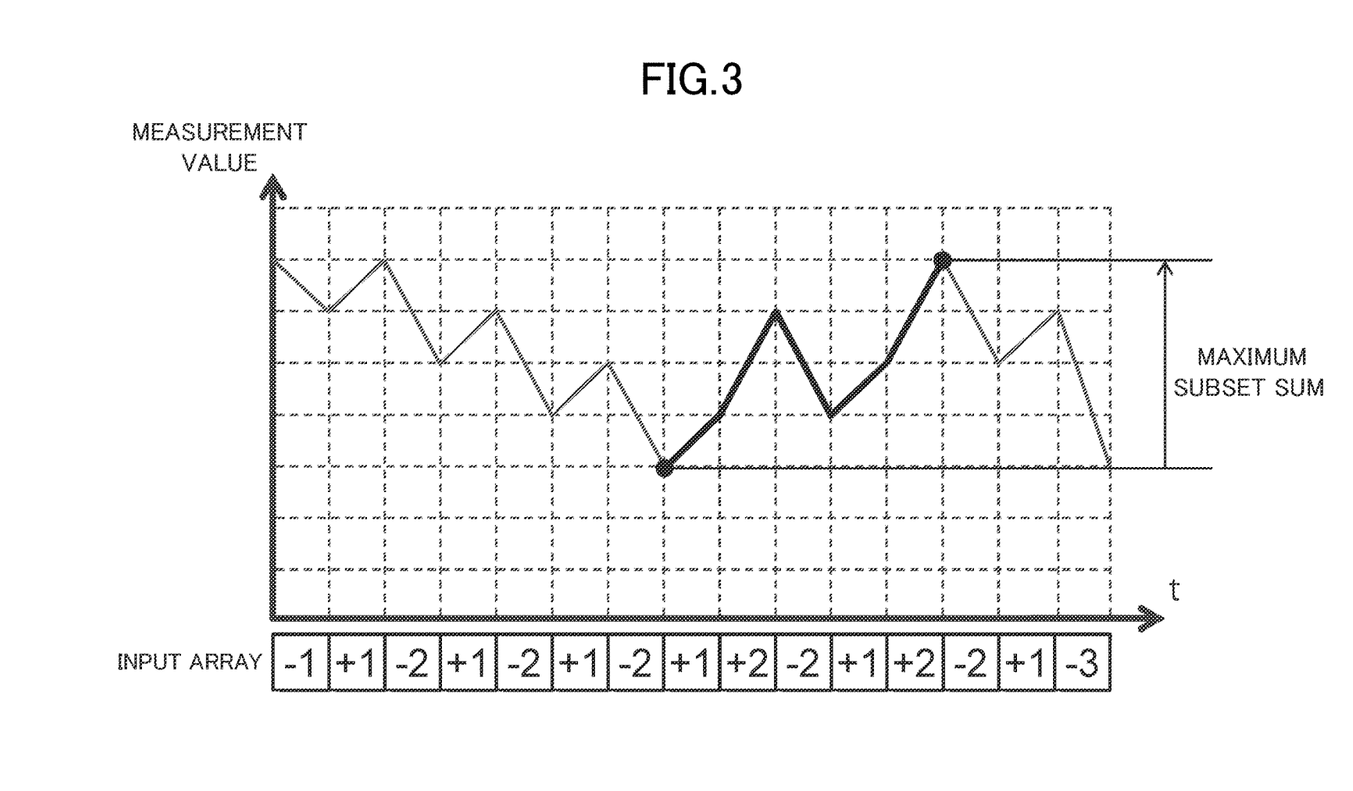
FIG. 3 is a diagram for illustrating an example of an input array for which a maximum subset sum is calculated.

FIG. 3 is a diagram for illustrating an example of an input array for which a maximum subset sum is calculated. The number of elements illustrated in FIG. 3 is 15, but in actuality, a larger number of elements are contained. In an exemplary graph of FIG. 3, the vertical axis indicates a measurement value and the horizontal axis indicates time. The elements in the input array are arranged in time series. The value of an element indicates a relative value obtained by subtracting, from a measurement value at a certain timing, a measurement value directly previous to that measurement value. In the case of this input array, the maximum subset sum of relative values corresponds to a maximum value of amounts by which the measurement value increases, for example, as time elapses. It is to be understood that the data is reduced in size by storing the relative value into the input array rather than storing the measurement value into the input array.

When the input array contains a temporal value, e.g., a measurement value of temperature, a period of time for which the input array is acquired may be a predetermined period of time, e.g., one day. When the period of time for a certain input array has elapsed, the input array may be switched to another input array for the next period of time so that the value at that moment is stored into an element of another input array. The input arrays corresponding to past periods of time after switching may be stored cumulatively, or may be deleted after the maximum subset sums are calculated.

A plurality of elements contained in an arbitrary element block A are arrayed consecutively in the input array. A next element of the last element in any element block A is the first element in the next element block A of that element block A. Further, a directly previous element of the first element in any element block A excluding the first block is the last element in the previous element block A of that element block A.

In this description, the size of one element block A is the same as a word length, which is an effective number of bits of a register of the processor 11. In the following, the word length is denoted as w, and the number of bits of each element is denoted as m (m is assumed to be half the w or less). The number of elements α contained in one element block A is a value obtained by rounding off (w/m). When the word length w and the number of bits of each element m are both a power of 2, α is simply (w/m). More specifically, for example, when the word length w is 128 bits and the element is a 4-bit signed integer, the number of elements α is 32. In an i-th element block A, elements of from an [(i−1)×α+1]-th place to an (i×α)-th place in the input array are arrayed in order of higher-order bits or lower-order bits.

Figure 4:
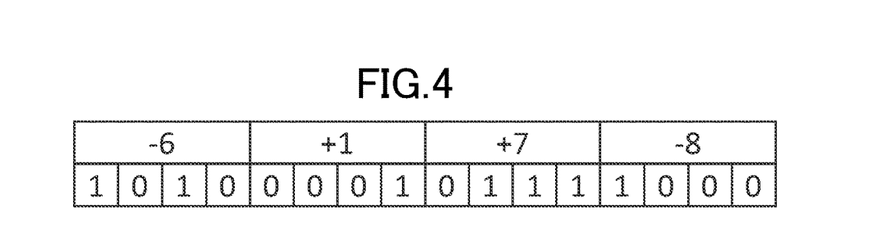
FIG. 4 is a diagram for illustrating an example of an element block.

FIG. 4 is a diagram for illustrating an example of the element block A. A plurality of elements are arrayed in one element block A. In the example of FIG. 4, a bit array stored in the element block A is described in a lower row, and a value indicated by that bit array is described in an upper row. In the example of FIG. 4, elements of the bit array are arrayed in order of bit from higher-order bit, but may be arrayed in order of bit from lower-order bit. Further, for ease of description, the word length w of the element block A illustrated in FIG. 4 is 16 bits, and the number of elements α in the element block A is 4. However, in actuality, those values may take larger values. Further, the number of bits m in an element may be different.

The block parameter calculation unit 52 is configured to calculate, for the acquired element block A, a total sum bsum of element values, a maximum value bmax of subset sums, a maximum value bmaxpre of subset sums summed from the first element, and a maximum value bmaxsuf of subset sums summed to the last element.

The total sum bsum of element values is the sum of values from the first element to the last element contained in the element block A. The maximum value bmaxpre of subset sums summed from the first element is the largest one of 0 and the sums of values of from the first element to a d-th element contained in the element block A, where d satisfies the condition (1≤d≤α). The maximum value bmaxsuf of subset sums summed to the last element is the largest one of 0 and the sums of values of from the d-th element to the last element contained in the element block A, where d satisfies the condition (1≤d≤α). The maximum value bmax of subset sums is the largest one of 0 and the sums of values of from a p-th element to a q-th element contained in the element block A, where the integers p and q satisfy the condition (1≤p≤q≤α). In the following, the subset sum of the element block A is defined as a sum of a plurality of consecutive elements contained in the element block A. Similarly, the subset sum of the input array is defined as a sum of a plurality of consecutive elements contained in the input array. The plurality of elements to be summed up as the subset sum are a part or all of the elements contained in the element block A or the input array. The maximum value of subset sums is defined as a value indicating the maximum value among 0 and subset sums calculated for all patterns of a part or all of the elements.

The maximum subset sum calculation unit 53 is configured to calculate a maximum subset sum (the maximum value of subset sums) in the input array based on the total sum bsum of element values, the maximum value bmax of subset sums, the maximum value bmaxpre of subset sums summed from the first element, and the maximum value bmaxsuf of subset sums summed to the last element, which are calculated by the block parameter calculation unit 52.

The result output unit 54 is configured to store information indicating the maximum subset sum calculated by the maximum subset sum calculation unit 53 into the storage unit 12, and to output the information to another computer via the communication unit 13 or to a display via the input/output unit 14. For example, the result output unit 54 performs control such that the display device displays the calculated maximum subset sum.

Figure 5:
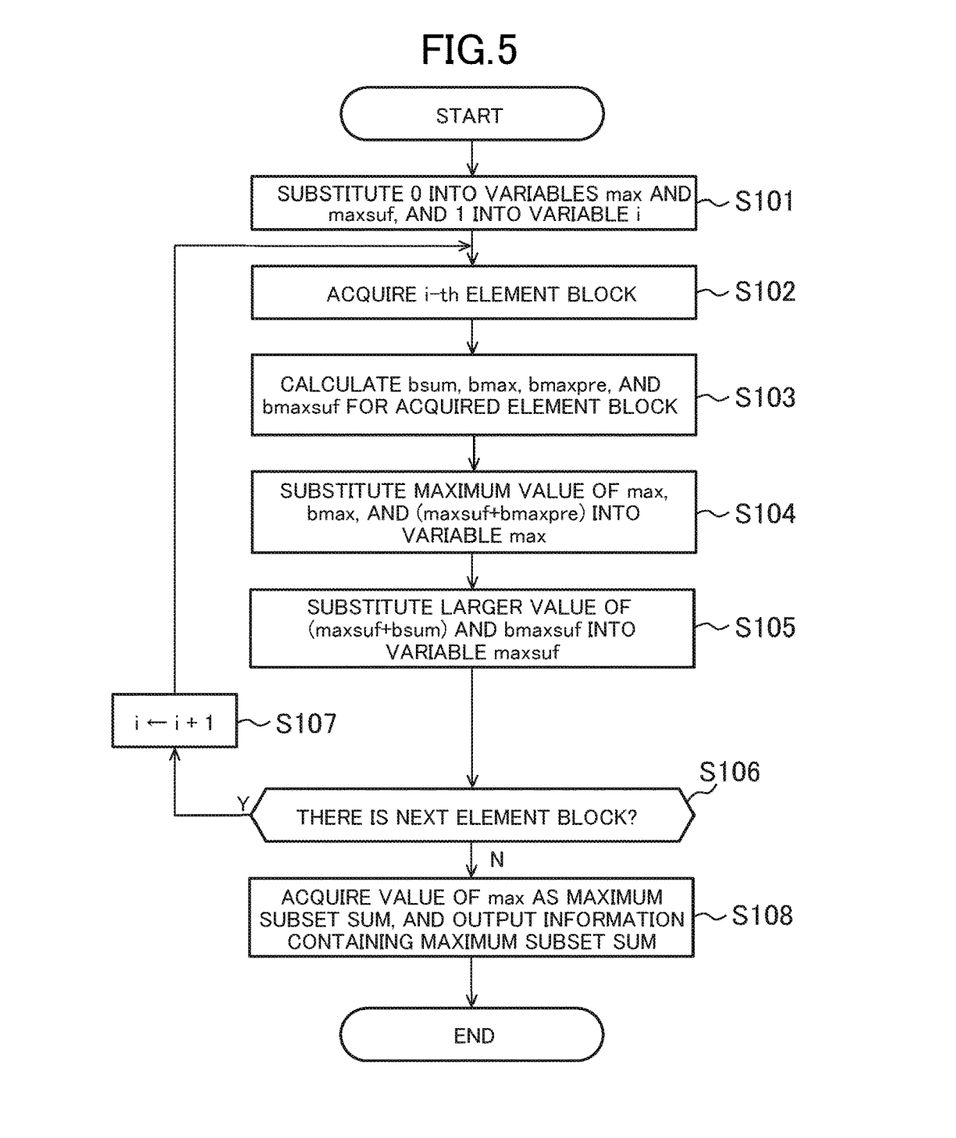
FIG. 5 is a flowchart for illustrating an example of an outline of processing by the information processing device.

Next, a description is given of processing to be executed by the information processing device. FIG. 5 is a flowchart for illustrating an outline of processing by the information processing device.

First, the maximum subset sum calculation unit 53 initializes the variables. More specifically, the maximum subset sum calculation unit 53 substitutes 0 into variables max and maxsuf, and 1 into a variable i serving as a loop counter (Step S101). The variable max stores the maximum value of subset sums for one or a plurality of element blocks A for which the processing has been conducted.

Next, the element block acquisition unit 51 acquires the i-th element block A from among a plurality of element blocks A contained in the input array (Step S102). Then, the block parameter calculation unit 52 calculates, for the acquired element block A, the total sum bsum of element values, the maximum value bmax of subset sums, the maximum value bmaxpre of subset sums summed from the first element, and the maximum value bmaxsuf of subset sums summed to the last element (Step S103).

Figure 6:
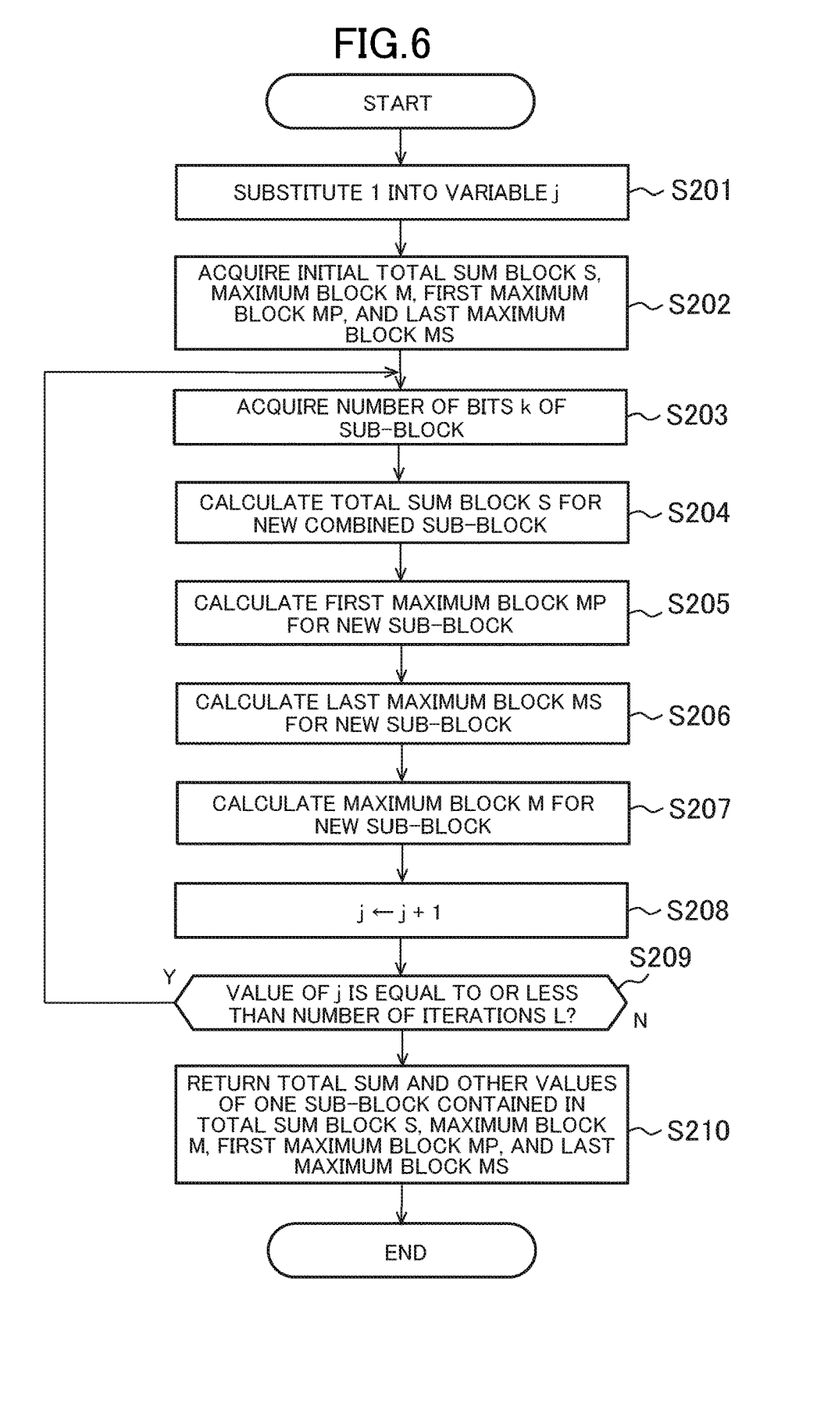
FIG. 6 is a flowchart for illustrating an example of processing by a block parameter calculation unit.

Now, a description is given of the processing of Step S103 more in detail. FIG. 6 is a flowchart for illustrating an example of processing by the block parameter calculation unit 52.

The initial processing unit 55 substitutes 1 into a variable j serving as a loop counter (Step S201). In this case, the number of iterations L in this loop processing of from Step S203 to Step S209 is a value obtained by rounding up ($\log_2 \alpha$).

Next, the initial processing unit 55 acquires an initial total sum block S, maximum block M, first maximum block MP, and last maximum block MS to be used for the first loop processing (Step S202). The total sum block S is a piece of data in which the sums of element values respectively calculated for a plurality of sub-blocks into which the element block A is divided are arrayed. Here, in this embodiment, each of the sub-blocks contained in a piece of data output by the initial processing unit 55 corresponds to a single element, and each of the sub-blocks contained in a piece of data calculated by the iterative processing unit 56 described later corresponds to a plurality of elements. The maximum block M is a piece of data in which the maximum values of subset sums respectively calculated for a plurality of sub-blocks are arrayed. The first maximum block MP is a piece of data in which the maximum values of subset sums summed from the first element respectively calculated for a plurality of sub-blocks are arrayed. The last maximum block MS is a piece of data in which the maximum values of subset sums summed to the last element respectively calculated for a plurality of sub-blocks are arrayed. The total sum block S, the maximum block M, the first maximum block MP, and the last maximum block MS, which are acquired in Step S202, are stored in registers of the processor 11.

In the following, a piece of data in which values of a plurality of sub-blocks are stored, such as the total sum block S, the maximum block M, the first maximum block MP, and the last maximum block MS, is simply referred to as "block". In this case, the bit length of a block is the word length w, and the number of sub-blocks contained in one block changes in the course of the processing. In this embodiment, the number of sub-blocks in the processing of the initial processing unit 55 is α, which is the same number as that of elements, and the bit length of a sub-block is the same as that of an element. The sub-block contains, for example, the total sum or maximum value of a corresponding one or plurality of elements, and the bit position of a sub-block storing the value is the same as that of the element block A in which the corresponding element is placed. When there are a plurality of sub-blocks, sub-blocks from a sub-block corresponding to the first element to a sub-block corresponding to the last element are arrayed in order in the block. Alternatively, with processing different from that described below, the initial processing unit 55 may generate a block in which respective sub-blocks correspond to a plurality of consecutive elements.

In Step S202, each of a plurality of sub-blocks corresponds to one element. The initial processing unit 55 generates the total sum block S by copying the element block A. Further, the initial processing unit 55 generates a block in which the sub-blocks each store a corresponding larger value (maximum value) of 0 and each element value of the element block A, and generates the maximum block M, first maximum block MP, and last maximum block MS by copying that block.

Now, a description is given of processing of acquiring a block Z storing maximum values of sub-blocks for the same bit position among two blocks P1 and P2, which is described as the following expression.

$$Z \leftarrow p\max_k(P1, P2) \qquad \text{[Math. 1]}$$

In the expression, k denotes the number of bits of a sub-block. The processing of this expression is realized by combining a bit operation and an integer operation. In the description of the following expressions, "&", "|", "~", "<<", ">>", and "^" indicate a bit logical product operation, bit logical sum operation, NOT operation, left shift operation, right shift operation, and logical exclusive or (XOR) operation, respectively. The processor 11 executes those bit operations, addition, and subtraction at the minimum clocks based on instructions from the processor. Further, those operations caused by instructions from the processor each operate the values of a plurality of sub-blocks stored in the register in bulk.

The block Z storing the maximum values is calculated based on the processing indicated by the following expressions.

$$V1 \leftarrow (((P2|H_k)-(P_1\&\sim H_k))\char`^ P1\char`^ P2)\&H_k$$

$$V2 \leftarrow (H_k-(V1>>(k-1)))\char`^ H_k$$

$$Z \leftarrow (\sim V2\& P1)|(V2\& P2) \quad \text{[Math. 2]}$$

In the expressions, "$H_k$" denotes a bit string having the highest-order bit of 1 and the other bits of 0 for each k-bit sub-block contained in a piece of data having the number of bits of a processing unit, and the bit string also has the same number of bits of a processing unit. Further, "$L_k$", which is described later, denotes a bit string having the lowest-order bit of 1 and the other bits of 0 for each k-bit sub-block contained in a piece of data having the number of bits of a processing unit, and the bit string also has the same number of bits of a processing unit. For example, $H_4$ indicates "10001000 . . . 10001000" in binary form, and $L_4$ indicates "0001000 . . . 00010001" in binary form.

When a piece of data in which the value of 0 is placed in the sub-blocks is N0, the initial processing unit 55 calculates pieces of data of the maximum block M, the first maximum block MP, and the last maximum block MS, based on $pmax_k(A, N0)$. The initial processing unit 55 may acquire the output of $pmax_k(A, N0)$ by acquiring V1 simply based on $(A\&H_k)$ and acquiring V2 with the expression described above to calculate ($\sim$V2&A). When the processor 11 includes a SIMD operation function, $pmax_k(A, N0)$ or parallel operation in blocks each handled as a unit described later may be implemented by SIMD instructions instead of a combination of instructions such as the bit operations, addition, and subtraction.

The iterative processing unit 56 is configured to iterate loop processing. The loop processing is processing of operating, for a plurality of sub-blocks, the total sum block S, the maximum block M, the first maximum block MP, and the last maximum block MS with a plurality of processor instructions that operate in bulk the values of a plurality of sub-blocks stored in the register, and calculating, for a new plurality of sub-blocks containing a new sub-block obtained by combining two adjacent sub-blocks, the new total sum block S, the new maximum block M, the new first maximum block MP, and the new last maximum block MS to be stored into a plurality of registers, respectively.

When the number of sub-blocks contained in a block at the time of starting j-th loop processing is $t_j$, a new sub-block is the one obtained by combining a (2s−1)-th sub-block and a 2s-th sub-block with respect to the first element ($1 \le s \le t_j/2$), and the number of new sub-blocks $t_{j+1}$ is half of $t_j$ (when $t_j$ is a multiple of 2). In the following, two sub-blocks to be combined are referred to as "two adjacent sub-blocks", and regarding those two adjacent sub-blocks, the (2s−1)-th sub-block, which is on the first element side, is referred to as "former block" and the 2s-th sub-block, which is on the last element side, is referred to as "latter block".

Now, the loop processing to be performed by the iterative processing unit 56 is described more specifically. First, the iterative processing unit 56 acquires the number of bits k of a sub-block (Step S203). Then, the iterative processing unit 56 calculates the new total sum block S, the new first maximum block MP, the new last maximum block MS, and the new maximum block M for a new sub-block (from Step S204 to Step S.

Figure 7:
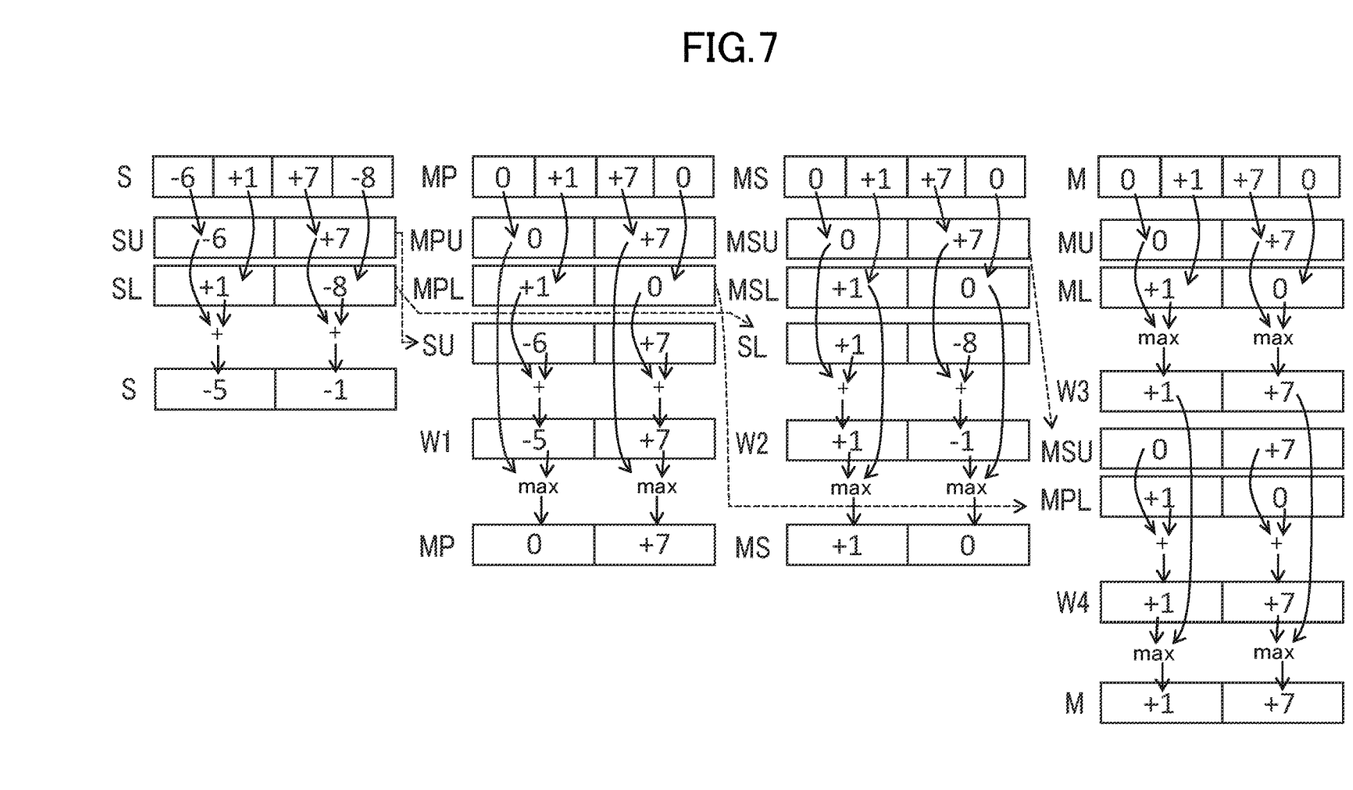
FIG. 7 is a diagram for illustrating states of data in iterative processing by an iterative processing unit.

Now, the processing from Step S204 to Step S207 is described more specifically. FIG. 7 is a diagram for illustrating states of data in the first loop processing to be performedby the iterative processing unit 56. In FIG. 7, an example is illustrated in which a new block having two new sub-blocks placed therein is calculated from a block having four sub-blocks placed therein through the loop processing.

In Step S204, the iterative processing unit 56 calculates the new total sum block S in which the sum of the total sum of element values for the former block and the total sum of element values for the latter block is placed as the total sum for a new sub-block. More specifically, the iterative processing unit 56 first generates an upper-level total sum block SU in which the value of the former block in the total sum block S is placed in the position of the new sub-block, and a lower-level total sum block SL in which the value of the latter block in the total sum block S is placed in the position of the new sub-block. The same processing is performed for the first maximum block MP, the last maximum block MS, and the maximum block M. In the following, a block in which the value of a former block is placed in a new sub-block and a block in which the value of a latter block is placed in a new sub-block are described as an upper-level block BU and a lower-level block BL, respectively.

Figure 8:
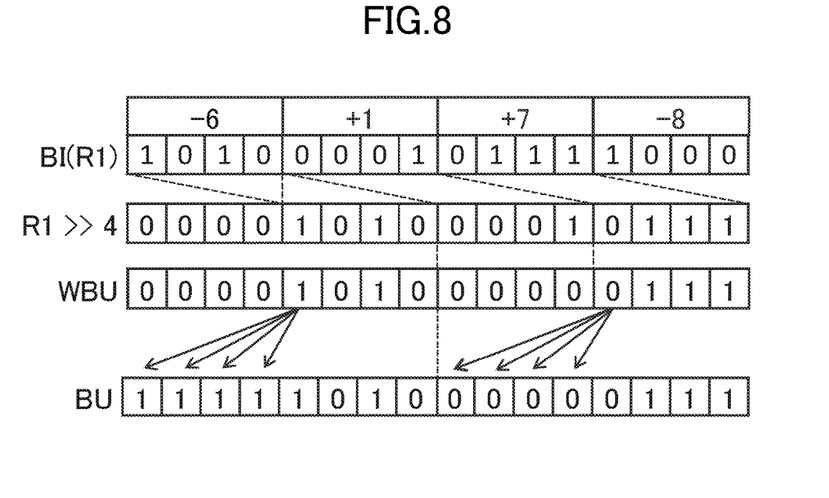
FIG. 8 is a diagram for illustrating processing of generating an upper-level block from a block.
Figure 9:
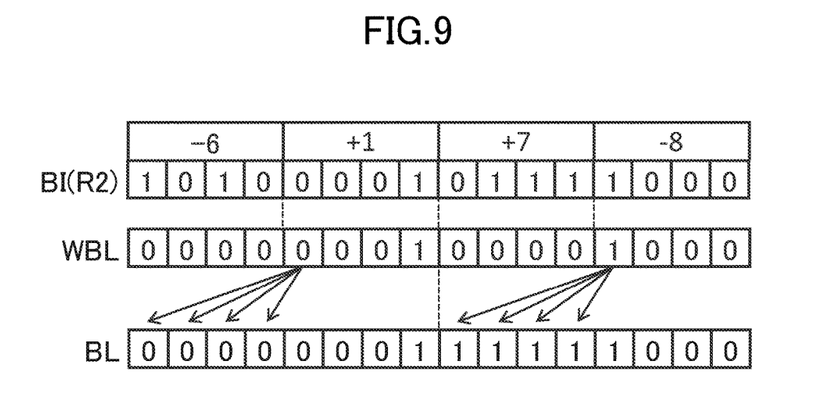
FIG. 9 is a diagram for illustrating processing of generating a lower-level block from a block.

FIG. 8 is a diagram for illustrating processing of generating the upper-level block BU from a block BI. FIG. 9 is a diagram for illustrating processing of generating the lower-level block BL from the block BI.

The processing of generating the upper-level block BU and the lower-level block BL includes: a first operation of placing, in registers R1 and R2, the block BI to be processed; a second operation of shifting bits of one of the first and second registers R1 and R2 such that the position of the former block stored in the register R1 and the position of the latter block stored in the register R2 match with each other (the register R1 is shifted in FIG. 8 and FIG. 9); a third operation of acquiring a block WBU in which only the former block contained in the total sum block S are placed; a fourth operation of acquiring the upper-level block BU by sign extension of former block contained in the block WBU to bit areas of new sub-blocks containing the bit areas of the former block; a fifth operation of acquiring a block WBL in which only the latter block contained in the total sum block S are placed; and a sixth operation of acquiring the lower-level block BL by sign extension of latter block contained in the block WBL to bit areas of new sub-blocks containing the bit areas of the latter block. The sign extension is a conversion operation for causing a bit area of a new sub-block to indicate a value indicated by the bit area of an original sub-block.

When the value of a sub-block is represented in two's complement form containing negative values, the sign extension is an operation of copying the highest-order bit of an original sub-block storing a value to all the bits of a sub-block on the higher order side than the highest-order bit of the original sub-block. Alternatively, the second operation may be performed on a register storing the block WBU or the block WBL after the third operation or the fifth operation.

The third operation is executed by the processor 11 calculating a logical product of R1 and data in which 1 is set for all the bits of a bit area having the former block placed therein. The fifth operation is executed by the processor 11 calculating a logical product of R2 and data in which 1 is set for all the bits of a bit area having the latter block placed therein after shifting. In this case of example, the data in which 1 is set for all the bits of a bit area having the former block placed therein and the data in which 1 is set for all the bits of a bit area having the latter block placed therein after shifting are "0000111100001111" in binary form. This data may be stored in advance in an array that enables acquisition thereof depending on values of the bit length k or the number of iterations.

The fourth operation and the sixth operation are executed by calculation represented by the following expressions. The processor 11 may execute the fourth operation and the sixth operation with use of sign extension instructions. In this case, the value of k is the bit length of a new sub-block.

$$BU \leftarrow ((H_k-(WBU \& H_{k/2}))\hat{\ }H_k)|WBU$$

$$BL \leftarrow ((H_k-(WBL \& H_{k/2}))\hat{\ }H_k)|WBL \qquad [\text{Math. 3}]$$

In the fourth operation, the processor 11 calculates a logical product of the register storing the block WBU and $H_{k/2}$, subtracts the result of the logical product from $H_k$, calculates a logical exclusive or of the result of subtraction and $H_k$, and takes a logical sum of the result of the logical exclusive or and WBU. In this manner, the upper-level block BU is calculated. Also in the sixth operation, the same calculation is performed for the block WBL. The results of various calculations are stored in the registers of the processor 11.

Through execution of from the first operation to the sixth operation described above for the total sum block S, the iterative processing unit 56 generates the upper-level total sum block SU and the lower-level total sum block SL, which are stored into different registers.

After the upper-level total sum block SU and the lower-level total sum block SL are generated, the iterative processing unit 56 calculates the new total sum block S in which the sum of values stored in areas corresponding to a new sub-block, which are contained in the upper-level total sum block SU and the lower-level total sum block SL, is placed.

Now, a description is given of processing of acquiring a block Z2 in which the sum of values of sub-blocks contained in the same bit position among two blocks P3 and P4 is placed, which is shown in the following expression.

$$Z2 \leftarrow padd_k(P3,P4) \qquad [\text{Math. 4}]$$

k denotes the bit length of a sub-block (corresponding to a new sub-block) contained in P3 and P4. The block Z2 storing the sum is calculated based on processing shown in the following expression.

$$Z2 \leftarrow ((P3 \& \sim H_k)+(P4 \& \sim H_k))\hat{\ }((P3\hat{\ }P4) \qquad [\text{Math. 5}]$$

The iterative processing unit 56 acquires the result of $padd_k(SU, SL)$ as a value of the new total sum block S.

In Step S205, the iterative processing unit 56 calculates the new first maximum block MP in which a larger one of a sum, which is the sum of the total sum of element values for the former block and the maximum value of subset sums summed from the first element for the latter block, and the maximum value of subset sums summed from the first element for the former block is placed as the maximum value of subset sums summed from the first element for a new sub-block. More specifically, through execution of from the first operation to the sixth operation described above for the first maximum block MP, the iterative processing unit 56 generates the upper-level first maximum block MPU and the lower-level first maximum block MPL. Then, the iterative processing unit 56 calculates $padd_k(SU, MPL)$ for placement in a block W1. The sum of two sub-blocks in the same position, which are contained in the upper-level total sum block SU and the lower-level first maximum block MPL, is placed in the block W1. The iterative processing unit 56 uses $pmax_k(W1, MPU)$ to calculate the new first maximum block MP. $pmax_k(W1, MPU)$ is processing of calculating the maximum value of two sub-blocks in the same position, which are contained in the block W1 and the upper-level first maximum block MPU.

In Step S206, the iterative processing unit 56 calculates the new last maximum block MS in which a larger one of a sum, which is the sum of the total sum for the latter block and the maximum value of subset sums summed to the last element for the former block, and the maximum value of subset sums summed to the last element for the latter block is placed as the maximum value of subset sums summed to the last element for a new sub-block. More specifically, through execution of from the first operation to the sixth operation described above for the last maximum block MS, the iterative processing unit 56 generates an upper-level last maximum block MSU and a lower-level last maximum block MSL. Then, the iterative processing unit 56 calculates $padd_k(SL, MSU)$ for placement in a block W2. The sum of two sub-blocks in the same position, which are contained in the lower-level total sum block SL and the upper-level last maximum block MSU, is placed in the block W2. The iterative processing unit 56 uses $pmax_k(W2, MSL)$ to calculate the new last maximum block MS $pmax_k(W2, MSL)$ is processing of calculating the maximum value of two sub-blocks in the same position, which are contained in the block W2 and the lower-level last maximum block MSL.

In Step S207, the iterative processing unit 56 calculates the maximum block M in which the largest one of a sum, which is the sum of the maximum value of subset sums summed to the last element for the former block and the maximum value of subset sums summed from the first element for the latter block, the maximum value of subset sums for the former block, and the maximum value of subset sums for the latter block is placed as the maximum value of subset sums for a new sub-block. More specifically, through execution of from the first operation to the sixth operation described above for the maximum block M, the iterative processing unit 56 generates an upper-level maximum block MU and a lower-level maximum block ML. Then, the iterative processing unit 56 calculates $pmax_k(MU, ML)$ for placement in a block W3. Further, the iterative processing unit 56 calculates $padd_k(MSU, MPL)$ for placement in a block W4. Finally, the iterative processing unit 56 uses $pmax_k(W3, W4)$ to calculate the new maximum block M.

The order of processing may be different from that of the above description. For example, the order of processing of Step S205 and Step S206 may be replaced.

After the new total sum block S, the new first maximum block MP, the new last maximum block MS, and the new maximum block M are calculated for a new sub-block, the iterative processing unit 56 increments the value of the variable j by one (Step S208), and when the value of j is equal to or less than the number of iterations L (Y in Step S209), the iterative processing unit 56 iterates the loop processing from Step S203. On the other hand, when the value of j is larger than the number of iterations L (N in Step S209), the parameter determination unit 57 determines a value stored in one sub-block contained in the total sum block S, the first maximum block MP, the last maximum block MS, and the maximum block M as the total sum bsum, the maximum value bmax of subset sums, the maximum value bmaxpre of subset sums summed from the first element, and the maximum value bmaxsuf of subset sums summed to the last element. Then, the parameter determination unit 57 passes those values to the maximum subset sum calculation unit 53 (Step S210).

When the word length of a block or the bit length of an element does not change, the number of iterations L of processing by the iterative processing unit 56 is constant, and thus the same program does not need to be repeatedly executed by looping. For example, a program of a first loop processing, a program of a second loop processing, . . . , and a program of a L-th loop processing may be prepared separately, and the iterative processing unit 56 may execute those programs sequentially. In this embodiment, a processing-related parameter, e.g., the number of elements contained in the element block A, is easily set to a constant value, and it is also possible to reduce a required period of time by optimizing processing.

After the total sum bsum, the maximum value bmax of subset sums, the maximum value bmaxpre of subset sums summed from the first element, and the maximum value bmaxsuf of subset sums summed to the last element are calculated, the maximum subset sum calculation unit 53 substitutes the maximum value among the variable max, the maximum value bmax of subset sums, and (maxsuf+bmaxpre) into the variable max (Step S104). The variable max before this processing is performed stores the value of the maximum subset sum in a partial array consisting of from the first element of the array to the last element of the previous element block A. In this processing, the maximum subset sum calculation unit 53 calculates the maximum subset sum in a new partial array constructed by combining the element blocks A that have been acquired until the current processing, and substitutes the maximum subset sum into the variable max. This new partial array consists of from the first element in the array to the last element of the current element block A.

Next, the maximum subset sum calculation unit 53 substitutes the value of a larger one of (maxsuf+bsum) and bmaxsuf into the variable maxsuf (Step S105). The variable maxsuf before this processing is performed stores the maximum value of subset sums summed to the last element in a partial array consisting of from the first element in the array to the last element of the previous element block A. In this processing, the maximum subset sum calculation unit 53 calculates the maximum value of subset sums summed to the final element in a new partial array constructed by combining the element blocks A that have been acquired until the current processing, which is required in the processing of the element block A to be acquired next, and stores the maximum value in the variable maxsuf.

Then, when there is the element block A to be acquired next (Y in Step S106), the maximum subset sum calculation unit 53 increments the value of the variable i by one (Step S107), and causes iteration of processing from Step S102. On the other hand, when there is no next element block A (N in Step S106), the result output unit 54 acquires the value of the variable max as the maximum subset sum calculated by the maximum subset sum calculation unit 53, and outputs information containing the maximum subset sum (Step S108).

In this embodiment, the order of computational complexity of the block parameter calculation unit 52 and the maximum subset sum calculation unit 53 is $O(n/\alpha \log \alpha)$. As the number of elements $\alpha$ contained in the element block A becomes larger, the computational complexity becomes smaller as compared to the Kadane method.

In the processing by the maximum subset sum calculation unit 53, the maximum subset sum calculation unit 53 calculates the maximum subset sum and the like with use of parameters relating to the partial array consisting of one or the plurality of element blocks A that have been processed by the block parameter calculation unit 52, and to the element block A at the current processing. Regardless of how many element blocks A have been acquired for processing, the fact still remains that there is the new element block A only on the last element side of the partial array. Thus, unlike the calculation within the element block A, there is no need to use the maximumvalue of subset sums calculated from the first element or the total sum in the partial array. With this, it is possible to reduce the amount of processing by the maximum subset sum calculation unit 53, which is difficult to be processed in parallel, and to acquire the effect of reducing processing time in total. Further, even when the number of elements contained in the input array is undefined, the processing can be continued, meaning that it is possible to receive times series data on temperature or a stock price little by little in a streaming manner in real time for processing.

The elements contained in an input array may not necessarily be signed integer values. For example, when the processor 11 contains SIMD instructions for operating a register in which a plurality of floating point numbers are placed, the elements may contain floating point numbers.

The invention claimed is:
1. An information processing device, comprising:
at least one processor; and
at least one memory device that stores a plurality of instructions, which when executed by the at least one processor, causes the at least one processor to:
acquire blocks, each of the blocks containing a series of a predetermined number of elements and being a part of an array, the array containing a plurality of elements containing respective element values;
determine, for each of the acquired blocks, a total sum of element values, a maximum value of subset sums, a maximum value of subset sums summed from a first element, and a maximum value of subset sums summed to a last element, wherein the determination is based on the acquired blocks; and
calculate a maximum value of subset sums in the array constructed by combining the acquired blocks, based on the total sum of element values, the maximum value of subset sums, the maximum value of subset sums summed from the first element, and the maximum value of subset sums summed to the last element for the each of the acquired blocks,
wherein, in the determination, the plurality of instructions cause the at least one processor to,
generate:
a total sum block in which total sums of element values, which are respectively calculated for a plurality of sub-blocks obtained by dividing each of the acquired blocks, are arrayed and stored in a register;
a maximum block in which maximum values of subset sums, which are respectively calculated for the plurality of sub-blocks, are arrayed and stored in a register;
a first maximum block in which maximum values of subset sums summed from the first element, which are respectively calculated for the plurality of sub-blocks, are arrayed and stored in a register; and a last maximum block in which maximum values of subset sums summed to the last element, which are respectively calculated for the plurality of sub-blocks, are arrayed and stored in a register;

iteratively execute processing of calculating, for a plurality of new sub-blocks containing a new sub-block obtained by combining adjacent two of the plurality of sub-blocks, a new total sum block, a new maximum block, a new first maximum block, and a new last maximum block to be stored into a plurality of registers, respectively, by operating the total sum block, the maximum block, the first maximum block, and the last maximum block for the plurality of sub-blocks with predetermined processor instructions for operating, in bulk, values of a plurality of sub-blocks stored in a register; and determine, after the processing is executed a predetermined number of times, the total sum of element values, the maximum value of subset sums, the maximum value of subset sums summed from the first element, and the maximum value of subset sums summed to the last element for the each of the blocks, based on the total sum block, the maximum block, the first maximum block, and the last maximum block.

2. The information processing device according to claim 1, wherein, in the iterative execution, a plurality of predetermined processor instructions cause the at least one processor to:

calculate the new total sum block in which a sum of a total sum of element values for a former block on the first element side among the adjacent two of the plurality of sub-blocks, and a total sum of element values for a latter block on the last element side among the adjacent two of the plurality of sub-blocks is placed as a total sum of element values for the new sub-block;

calculate the new first maximum block in which a larger one of a sum, which is the sum of the total sum of element values for the former block and a maximum value of subset sums summed from the first element for the latter block, and a maximum value of subset sums summed from the first element for the former block is placed as a maximum value of subset sums summed from the first element for the new sub-block;

calculate the new last maximum block in which a larger one of a sum, which is the sum of a total sum for the latter block and a maximum value of subset sums summed to the last element for the former block, and a maximum value of subset sums summed to the last element for the latter block is placed as a maximum value of subset sums summed to the last element for the new sub-block; and calculate the new maximum block in which a largest one of a sum, which is the sum of the maximum value of subset sums summed to the last element for the former block and the maximum value of subset sums summed from the first element for the latter block, a maximum value of subset sums for the former block, and a maximum value of subset sums for the latter block is placed as a maximum value of subset sums for the new sub-block.

3. The information processing device according to claim 1, wherein, in the acquisition of the blocks, the at least one processor acquires a next block as a current block after the determination of the total sum of element values, the maximum value of subset sums, the maximum value of subset sums summed from the first element, and the maximum value of subset sums summed to the last element for each of the blocks, wherein, in the determination, the at least one processor determines, for the current block, the total sum of element values, the maximum value of subset sums, the maximum value of subset sums summed from the first element, and the maximum value of subset sums summed to the last element, and wherein, in the calculation of maximum value of subset sum, the at least one processor determines, each time the determination of the total sum of element values, the maximum value of subset sums, the maximum value of subset sums summed from the first element, and the maximum value of subset sums summed to the last element for the current block, a maximum value of subset sums in a new element group consisting of from a first element of the array to a last element of the current block, and a maximum value of subset sums summed to a final element in the new element group, based on a maximum value of subset sums in an element group consisting of from the first element of the array to the last element of a previous block, a maximum value of subset sums summed to the final element in the element group, the total sum of element values, the maximum value of subset sums, the maximum value of subset sums summed from the first element, and the maximum value of subset sums summed to the last element for the current block.

4. An information processing method, comprising:

a step of acquiring blocks, each of the blocks containing a series of a predetermined number of elements and being a part of an array, the array containing a plurality of elements containing respective element values;

a block parameter determination step of determining, for each of the acquired blocks, a total sum of element values, a maximum value of subset sums, a maximum value of subset sums summed from a first element, and a maximum value of subset sums summed to a last element, wherein the determination is based on the acquired blocks; and a step of calculating a maximum value of subset sums in the array constructed by combining the acquired blocks, based on the total sum of element values, the maximum value of subset sums, the maximum value of subset sums summed from the first element, and the maximum value of subset sums summed to the last element for the each of the acquired blocks, wherein the block parameter determination step comprises:

generating:

a total sum block in which total sums of element values, which are respectively calculated for a plurality of sub-blocks obtained by dividing the each of the acquired blocks, are arrayed and stored in a register;

a maximum block in which maximum values of subset sums, which are respectively calculated for the plurality of sub-blocks, are arrayed and stored in a register;

a first maximum block in which maximum values of subset sums summed from the first element, which are respectively calculated for the plurality of sub-blocks, are arrayed and stored in a register; and a last maximum block in which maximum values of subset sums summed to the last element, which are respectively calculated for the plurality of sub-blocks, are arrayed and stored in a register;

iteratively executing processing of calculating, for a plurality of new sub-blocks containing a new sub-block obtained by combining adjacent two of the plurality of sub-blocks, a new total sum block, a new maximum block, a new first maximum block, and a new last maximum block to be stored into a plurality of registers, respectively, by operating the total sum block, the maximum block, the first maximum block, and the last maximum block for the plurality of sub-blocks with predetermined processor instructions for operating, in bulk, values of a plurality of sub-blocks stored in a register; and determining, after the processing is executed a predetermined number of times, the total sum of element values, the maximum value of subset sums, the maximum value of subset sums summed from the first element, and the maximum value of subset sums summed to the last element for the each of the blocks, based on the total sum block, the maximum block, the first maximum block, and the last maximum block.

5. A computer-readable non-transitory storage medium for storing a program that causes a computer to execute processing of:

acquiring blocks, each of the blocks containing a series of a predetermined number of elements and being a part of an array, the array containing a plurality of elements containing respective element values;

determining, for each of the acquired blocks, a total sum of element values, a maximum value of subset sums, a maximum value of subset sums summed from a first element, and a maximum value of subset sums summed to a last element, wherein the determination is based on the acquired blocks; and calculating a maximum value of subset sums in the array constructed by combining the acquired blocks, based on the total sum of element values, the maximum value of subset sums, the maximum value of subset sums summed from the first element, and the maximum value of subset sums summed to the last element for the each of the acquired blocks, wherein the determination comprises the processing of:
generating:
a total sum block in which total sums of element values, which are respectively calculated for a plurality of sub-blocks obtained by dividing the each of the acquired blocks, are arrayed and stored in a register;

a maximum block in which maximum values of subset sums, which are respectively calculated for the plurality of sub-blocks, are arrayed and stored in a register;

a first maximum block in which maximum values of subset sums summed from the first element, which are respectively calculated for the plurality of sub-blocks, are arrayed and stored in a register; and a last maximum block in which maximum values of subset sums summed to the last element, which are respectively calculated for the plurality of sub-blocks, are arrayed and stored in a register;

iteratively executing processing of calculating, for a plurality of new sub-blocks containing a new sub-block obtained by combining adjacent two of the plurality of sub-blocks, a new total sum block, a new maximum block, a new first maximum block, and a new last maximum block to be stored into a plurality of registers, respectively, by operating the total sum block, the maximum block, the first maximum block, and the last maximum block for the plurality of sub-blocks with predetermined processor instructions for operating, in bulk, values of a plurality of sub-blocks stored in a register; and determining, after the processing is executed a predetermined number of times, the total sum of element values, the maximum value of subset sums, the maximum value of subset sums summed from the first element, and the maximum value of subset sums summed to the last element for the each of the blocks, based on the total sum block, the maximum block, the first maximum block, and the last maximum block.

* * * * *